(12) United States Patent
Chin et al.

(10) Patent No.: US 7,229,602 B2
(45) Date of Patent: Jun. 12, 2007

(54) METHOD OF PREPARING METAL CHALCOGENIDE PARTICLES

(75) Inventors: Wee Shong Chin, Singapore (SG); Zhihua Zhang, Singapore (SG); Wen Pei Lim, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 10/559,199

(22) PCT Filed: Jun. 4, 2004

(86) PCT No.: PCT/SG2004/000165

§ 371 (c)(1),
(2), (4) Date: Dec. 2, 2005

(87) PCT Pub. No.: WO2004/108598

PCT Pub. Date: Dec. 16, 2004

(65) Prior Publication Data

US 2006/0127302 A1    Jun. 15, 2006

(51) Int. Cl.
*C01B 17/20* (2006.01)
*C01B 19/00* (2006.01)
*C01G 1/00* (2006.01)

(52) U.S. Cl. .................. 423/508; 423/592.1; 423/509; 423/511; 423/561.1; 423/566.1; 423/566.2; 423/566.3; 977/773; 977/775; 977/777; 977/811

(58) Field of Classification Search ............. 423/592.1, 423/508, 509, 511, 561.1, 566.1, 566.2, 566.3; 252/301.6 S, 301.4 S; 977/773, 775, 777, 977/811
See application file for complete search history.

(56) References Cited

U.S. PATENT DOCUMENTS 4,390,514 A * 6/1983 Chianelli et al. ........... 423/509
2005/0084443 A1* 4/2005 Bawendi et al. ......... 423/561.1

FOREIGN PATENT DOCUMENTS

| JP | 52-147593 | 12/1977 |
| JP | 05-113586 | 5/1993 |
| JP | 2003-089522 | 3/2003 |
| WO | WO 99/37832 | 7/1999 |
| WO | WO 02/29140 | 4/2002 |

* cited by examiner

*Primary Examiner*—Timothy C. Vanoy
(74) *Attorney, Agent, or Firm*—Roberts & Roberts, LLP

(57) ABSTRACT

A method of preparing metal chalcogenide particles. The method comprising the step of reacting an amine and metal complex precursors. The metal complex precursors comprising a chalcogenide and an electrophilic group. The reaction forming metal chalcogenide particles substantially free of the electrophilic group.

20 Claims, 12 Drawing Sheets

METHOD OF PREPARING METAL CHALCOGENIDE PARTICLES

TECHNICAL FIELD

The present invention generally relates to a method of preparing metal chalcogenide particles, and in particular nano-sized chalcogenide particles. The present invention also relates to method of preparing metal chalcogenide particles of desired morphology.

BACKGROUND

In recent times, nano-sized metal chalcogenides materials have been the subject of significant research due to their potential applications as biological markers, nonlinear optical materials, luminescent devices, photodetectors, catalysts, and chemical sensors, etc. One known method to prepare metal chalcogenide nanomaterials involves reaction in a confined medium such as microemulsion or polymer matrix whereby difficulty has been encountered in producing particles of uniform sizes.

One known method involves thermolysis of an organometallic precursor in the presence of a chalcogen source at relatively high temperatures in the range of 120° C. to 300° C. The high temperatures utilised in these known methods are disadvantageous in that the reactants may be rendered hazardous to handle, may require the use of specialised equipment and utilise significant amounts of energy in the reaction. Furthermore, the reaction may require the use of an inert atmosphere. In addition, some of the precursors may have to be prepared under special conditions, as they are hazardous and may be explosive in nature. This increases the cost of producing metal chalcogenide particles, particularly on an industrial scale.

While many studies have focused on the control of nanoparticles sizes for their quantum confined properties, the ability to produce monodispersed nanocrystals with predictable shape remains an intricate challenge in nanomaterials synthesis. The simultaneous control of crystal shapes, in addition to their sizes and the higher surface-to-volume ratio, would be advantageous.

Controlling the shape of nanoparticles has thus far been achieved in two ways:
  (i) using a template (e.g. porous alumina, polymer membranes, carbon nanotubes and rodlike micelles); and
  (ii) in solutions by employing appropriate capping agents (e.g. surfactants, polymers, and ligands).

The latter method is more attractive due to higher yield and simplicity, without the need of removing the template after preparation. Among the solution methods, the injection of an organometallic precursor into a hot coordinating solvent provides a simple route to produce particles with desirable properties (i.e. high crystallinity, uniform shapes and sizes with a high degree of monodispersity). However, such method usually involves elaborate preparation of air-sensitive organometallic complexes that decompose exothermically in air, and also the use of high temperatures as outlines above.

There is a need to provide a method of preparing metal chalcogenide particles, and in particular nano-sized chalcogenide particles, that overcome or at least ameliorate one or more of the disadvantages described above.

There is a need to provide a method of preparing nano-sized metal chalcogenide particles in which the shape and size of the formed particles can be controlled.

SUMMARY OF THE INVENTION

According to a first aspect, there is provided a method of preparing metal chalcogenide particles comprising the step of reacting an amine and metal complex precursors, the metal complex precursors comprising a chalcogenide and an electrophilic group, the amine comprising a primary or secondary amine, whereby the reacting forms metal chalcogenide particles substantially free of the electrophilic group.

In one embodiment, there is provided a method of preparing nano-sized metal chalcogenide particles, the method comprising the step of reacting an amine and metal complex precursors, the metal complex precursors comprising a chalcogenide and an electrophilic group, the amine comprising primary or secondary amines, whereby the reacting forms nano-sized metal chalcogenide particles substantially free of the electrophilic group.

According to a second aspect, there is provided a method of preparing metal chalcogenide particles comprising the steps of:
  (i) providing a reaction solution comprising a selected amount of an amine and a selected amount of metal complex precursors, the metal complex precursors comprising a chalcogenide and an electrophilic group, the amine being a primary or a secondary amine; and
  (ii) stirring the reaction solution at a temperature and for a time to form a suspension of metal chalcogenide particles, wherein the temperature and the selected amounts of amine and metal complex precursors in the reaction solution determine the morphology and required size of the formed metal chalcogenide particles.

In one embodiment of the second aspect, the metal chalcogenide particles are nano-sized metal chalcogenide particles.

According to a third aspect, there is provided a metal chalcogenide particle prepared according to the first or second aspect.

According to a fourth aspect, there is provided a nano-sized metal chalcogenide particle prepared according to the method of the first or second aspect.

In one embodiment, there is provided nano-sized metal chalcogenide particles prepared from a method comprising the step of reacting an amine and metal complex precursors, the metal complex precursors comprising a chalcogenide and an electrophilic group, the amine comprising a primary or secondary amine, the reacting forming nano-sized metal chalcogenide particles substantially free of the electrophilic group.

According to a fifth aspect, there is provided a structure comprising a coherent mass of nano-sized metal chalcogenide particles prepared from a method comprising the step of reacting an amine and metal complex precursors, the metal complex precursors comprising a chalcogenide and an electrophilic group, the amine comprising a primary or secondary amine, the reacting forming nano-sized metal chalcogenide particles substantially free of the electrophilic group.

According to a sixth aspect, there is provided a method of preparing metal chalcogenide particles comprising the step of reacting an amine and metal complex precursors, the metal complex precursors comprising a chalcogenide and an electrophilic group, whereby the reacting forms metal chalcogenide particles substantially free of the electrophilic group.

According to a seventh aspect, there is provided a reaction solution for preparing metal chalcogenide particles, the reaction solution comprising:

an amine and metal complex precursors, the metal complex precursors comprising a chalcogenide and an electrophilic group, the amine comprising a primary or secondary amine, the amounts of amine and metal complex precursors in the reaction solution being sufficient to form metal chalcogenide particles substantially free of the electrophilic group.

DISCLOSURE OF EMBODIMENTS

Exemplary non-limiting embodiments of a method of preparing metal chalcogenide particles, will now be disclosed. The method includes the step of reacting an amine and metal complex precursors. The metal complex precursors comprised of a chalcogenide and may be bonded to an electrophilic group. The reaction forming metal chalcogenide particles that are substantially free of the electrophilic group.

In one embodiment of the method, the amount of the amine and the amount of metal complex precursors in the reaction solution may be selected to determine the size and morphology of the metal chalcogenide particles. The molar ratio of amine to metal complex precursors in the reaction solution may be selected from the group consisting of: 0.1 to 100; 1 to 100; 0.1 to 50; 1 to 40; 4 to 40; 2 to 35; and 5 to 35.

The amount of temperature of the reaction solution may be selected to determine the size and morphology of the metal chalcogenide particles. The temperature of the reaction solution may be selected from the group consisting of: −5° C. to 300° C.; 15° C. to 200° C.; 70° C. to 150° C.; 75° C. to 140° C.; 80° C. to 130° C.; and 80° C. to 120° C.

The morphology of the nano-sized metal chalcogenide particles may be selected from the group consisting of: substantially wire shaped, substantially triangular shaped, substantially disk-like shaped (platelets), substantially dendrite shaped, substantially cube shaped, substantially rectangular shaped, substantially rod shaped, substantially spherical shape, substantially spindle shape, substantially hexagonal shape and substantially octagonal shape.

The reaction solution may be an aqueous or non-aqueous solution. The reaction may be carried out directly on substrates or matrices without the use of solvents.

The reaction of the amine and the metal complex precursors may occur for a time in the range selected from the group consisting of: 1 minute to 1440 minutes; 1 minute to 720 minutes; 1 minute to 350 minutes; 1 minute to 240 minutes; 2 minutes to 180 minutes; and 5 minutes to 120 minutes.

The mean particle size of the nano-sized metal chalcogenide particles may be in the range selected from the group consisting of: 1 nm to 500 µm; 1 nm to 400 µm; 1 nm to 300 µm; 1 nm to 200 µm; 1 nm to 100 µm; 1 nm to 50 µm; 1 nm to 25 µm; 1 nm to 15 µm; 1 nm to 7 µm; 15 nm to 500 nm; 15 nm to 400 nm; 15 nm to 350 nm; 15 nm to 300 nm; 15 nm to 250 nm; 15 nm to 200 nm; 15 nm to 150 nm; 15 nm to 100 nm; and 15 to 40 nm.

The metal complex precursors may have the general formula:

$$M_z[X(CY)R]_n$$

where M is a metal or transition metal selected from the groups consisting of groups Ib, IIb, IIIa, IIIb, IVa, IVb, Va, Vb, VIb, VIIb and VIII of the Periodic Table;

where X is a chalcogen selected from the group consisting of: S, Se, Te;

where R is a hydrocarbon;

where CY is an electrophilic group; and where n ranges from 1 to 6 and z ranges from 1 to 6 depending on the valence number of M and [X(CY)R].

In one embodiment, the R may be an alkyl group. The alkyl group may be saturated or unsaturated. The alkyl group of R may have 1 to 20 carbon atoms. The number of carbon atoms on the alkyl group of R may be selected from the group consisting of: 1 to 20; 2 to 20; 3 to 20; 4 to 20; 5 to 20; 6 to 20; 7 to 20; 8 to 20; 9 to 20; 10 to 20; 11 to 20; 12 to 20; 13 to 20; 14 to 20; 15 to 20; 16 to 20; 17 to 20; 18 to 20; 19 to 20; 1 to 19; 1 to 18; 1 to 17; 1 to 16; 1 to 15; 1 to 14; 1 to 13; 1 to 12; 1 to 11; 1 to 10; 1 to 9; 1 to 8; 1 to 7; 1 to 6; 1 to 5; 1 to 4; 1 to 3; and 1 to 2.

The alkyl groups of R can be linear, branched and cyclic. Exemplary linear alkyl groups include methyl, ethyl, propyl, butyl, pentyl, hexyl, heptyl, octyl, decyl, dodecyl, tetradecyl, hexadecyl and octadecyl. Exemplary branched alkyl groups include isobutyl, tertiary butyl, isopentyl, 2-ethylhexyl, and 2,4,4-trimethylpentyl. Exemplary cyclic groups include cyclobutyl, cyclopentyl, cyclohexyl, methylcyclohexyl, dimethylcyclohexyl, and decanyl.

Exemplary unsaturated alkyl groups include hexenyl, hexadecenyl, oleyl, and hexynyl.

In one embodiment, the R may be a substituted alkyl group. Exemplary substituents include I, Br, Cl, F, $NO_2$, $NH_2$, $SO_3H$, COH, COOH, COOR" (where R" is the same or different from R).

In one embodiment, the R may be an aryl group. The aryl group of R may have 6 to 12 carbon atoms. The number of carbon atoms on the aryl group of R may be selected from the group consisting of: 6 to 12; 7 to 12; 8 to 12; 9 to 12; 10 to 12; 11 to 12; 6 to 11; 6 to 10; 6 to 9; 6 to 8; and 6 to 7. Exemplary aryl groups include phenyl, benzyl, tolyl, xylyl, 2-phenyl-2-methylethyl, naphthyl, methylnaphthyl, ethylnaphthyl, 2-naphthylethyl, and 2-phenylethyl.

In one embodiment, the R may be a substituted aryl group. Exemplary substituents include I, Br, Cl, F, $NO_2$, $NH_2$, $SO_3H$, COH, COOH, COOR" (where R" is the same or different from R).

The electrophilic group may include a carbonyl group (C=O), or CS. The carbonyl group or CS may be joined to the X and may be bonded directly to a carbon atom of the R.

The amine may be a primary amine, or a secondary amine represented by the general formula:

$$(R')_x(R'')_y NH_x$$

wherein R' and R" are hydrocarbon groups which is the same or different, x is 1 or 2 and y is 0 or 1 wherein when y is 1 then x is 1. The hydrocarbon group of R' and R" may have 1 to 20 carbon atoms.

In one embodiment, the R' or R", or both, may be an alkyl group. The alkyl group of R' or R", or both, may have 1 to 20 carbon atoms. The number of carbon atoms on the alkyl group of R' or R", or both, may be selected from the group consisting of: 1 to 20; 2 to 20; 3 to 20; 4 to 20; 5 to 20; 6 to 20; 7 to 20; 8 to 20; 9 to 20; 10 to 20; 11 to 20; 12 to 20; 13 to 20; 14 to 20; 15 to 20; 16 to 20; 17 to 20; 18 to 20; 19 to 20; 1 to 19; 1 to 18; 1 to 17; 1 to 16; 1 to 15; 1 to 14; 1 to 13; 1 to 12; 1 to 11; 1 to 10; 1 to 9; 1 to 8; 1 to 7; 1 to 6; 1 to 5; 1 to 4; 1 to 3; and 1 to 2.

The alkyl groups of R' or R", or both, can be linear, branched and cyclic. Exemplary linear alkyl groups include methyl, ethyl, propyl, butyl, pentyl, hexyl, heptyl, octyl, decyl, dodecyl, tetradecyl, hexadecyl and octadecyl. Exemplary branched alkyl groups include isobutyl, tertiary butyl, isopentyl, 2-ethylhexyl, and 2,4,4-trimethylpentyl. Exemplary cyclic groups include cyclobutyl, cyclopentyl, cyclohexyl, methylcyclohexyl, dimethylcyclohexyl, and decanyl.

Exemplary unsaturated alkyl groups include hexenyl, hexadecenyl, oleyl, and hexynyl.

In one embodiment, the R' or R", or both, may be a substituted alkyl group. Exemplary substituents include I, Br, Cl, F, $NO_2$, $NH_2$, $SO_3H$, COH, COOH, COOR''' (where R''' is the same or different from R' or R").

Exemplary alkylamines that may be used include methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, octadecylamine, hexenylamine, hexadecenylamine, oleylamine, hexynylamine, isobutylamine, isopentylamine, dimethylamine, diethylamine, dipropylamine, dibutylamine, dipentylamine, dihexylamine, diheptylamine, dioctylamine, trimethylamine, triethylamine, trioctylamine, cyclopropylamine, cyclobutylamine, cyclopentylamine, cyclohexylamine, dicyclohexylamine, n-methylcyclohexylamine, n,n-dimethylcyclohexylamine, ethylenediamine, diamonobutane, diaminopropane, diaminohexane, diaminododecane, diaminooctane, glycine, alanine, lysine, cysteine, tyrosine.

In one embodiment, the R' or R", or both, may be an aryl group. The number of carbon atoms on the aryl group of R' or R", or both, may be selected from the group consisting of: 6 to 12; 7 to 12; 8 to 12; 9 to 12; 10 to 12; 11 to 12; 6 to 11; 6 to 10; 6 to 9; 6 to 8; and 6 to 7. Exemplary aryl groups include phenyl, benzyl, tolyl, xylyl, 2-phenyl-2-methylethyl, naphthyl, methylnaphthyl, ethylnaphthyl, 2-naphthylethyl, and 2-phenylethyl.

In one embodiment the R' or R", or both, may be a substituted aryl group. Exemplary substituents include I, Br, Cl, F, $NO_2$, $NH_2$, $SO_3H$, COH, COOH, COOR''' (where R''' is the same or different from R' or R").

Exemplary arylamines that may be used include aniline, aminobenzaldehyde, toluene-2,4-diamine, aminobenzophenone, and polyaniline.

In another embodiment, the R' or R", or both may be a hydrocarbon polymer comprising alkyl groups or aryl groups or both.

BRIEF DESCRIPTION OF DRAWINGS

Non-limiting examples of the invention, including the best mode, and a comparative example will be further described with reference to the accompanying drawings in which.

DETAILED DESCRIPTION OF EMBODIMENTS

Preparation of Metal Chalcogenide Particles

Figure 1:
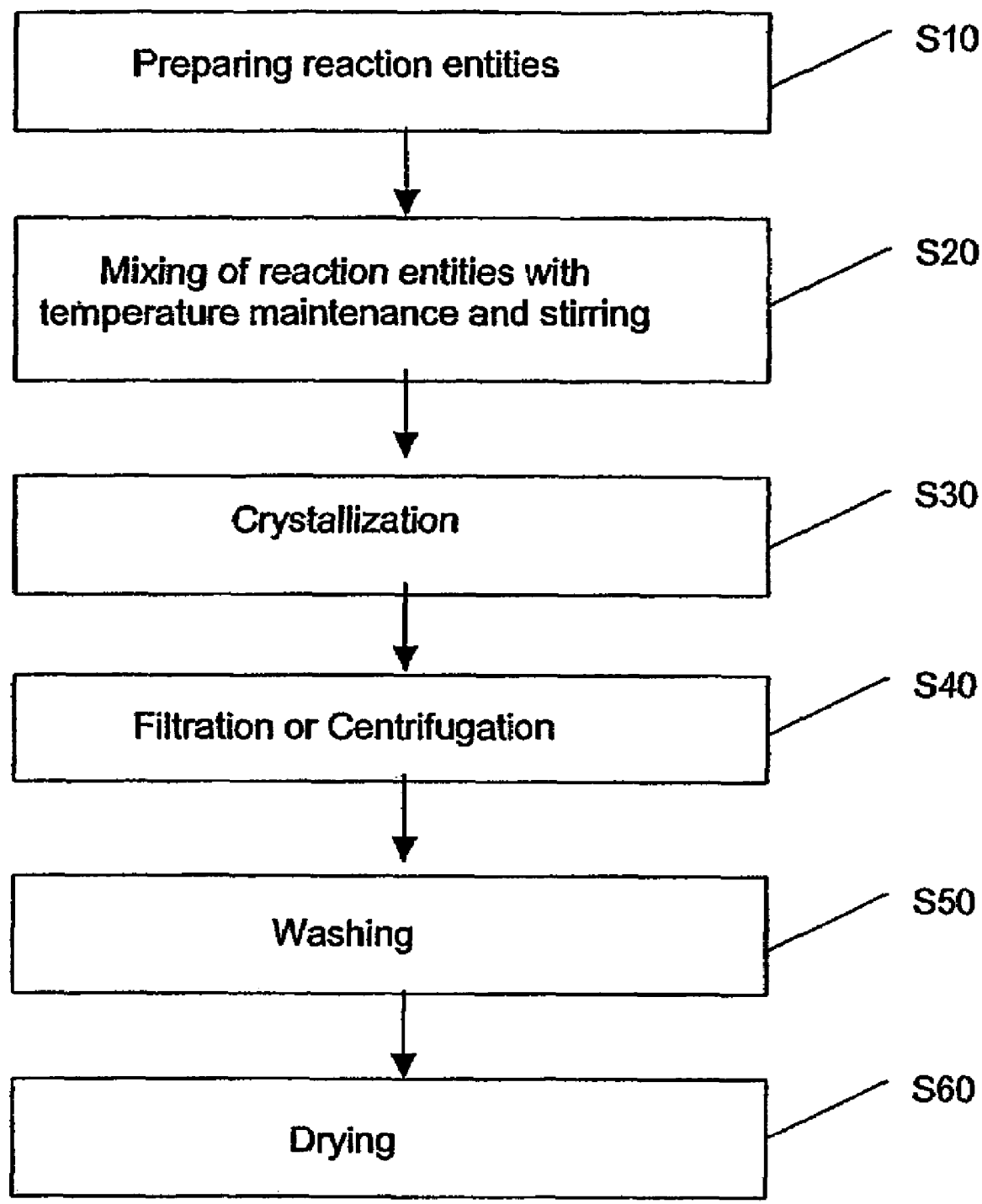
FIG. 1 shows a flow diagram of a method for producing nano-sized metal chalcogenide particles in accordance with a first embodiment of the present invention.
Figure 2:
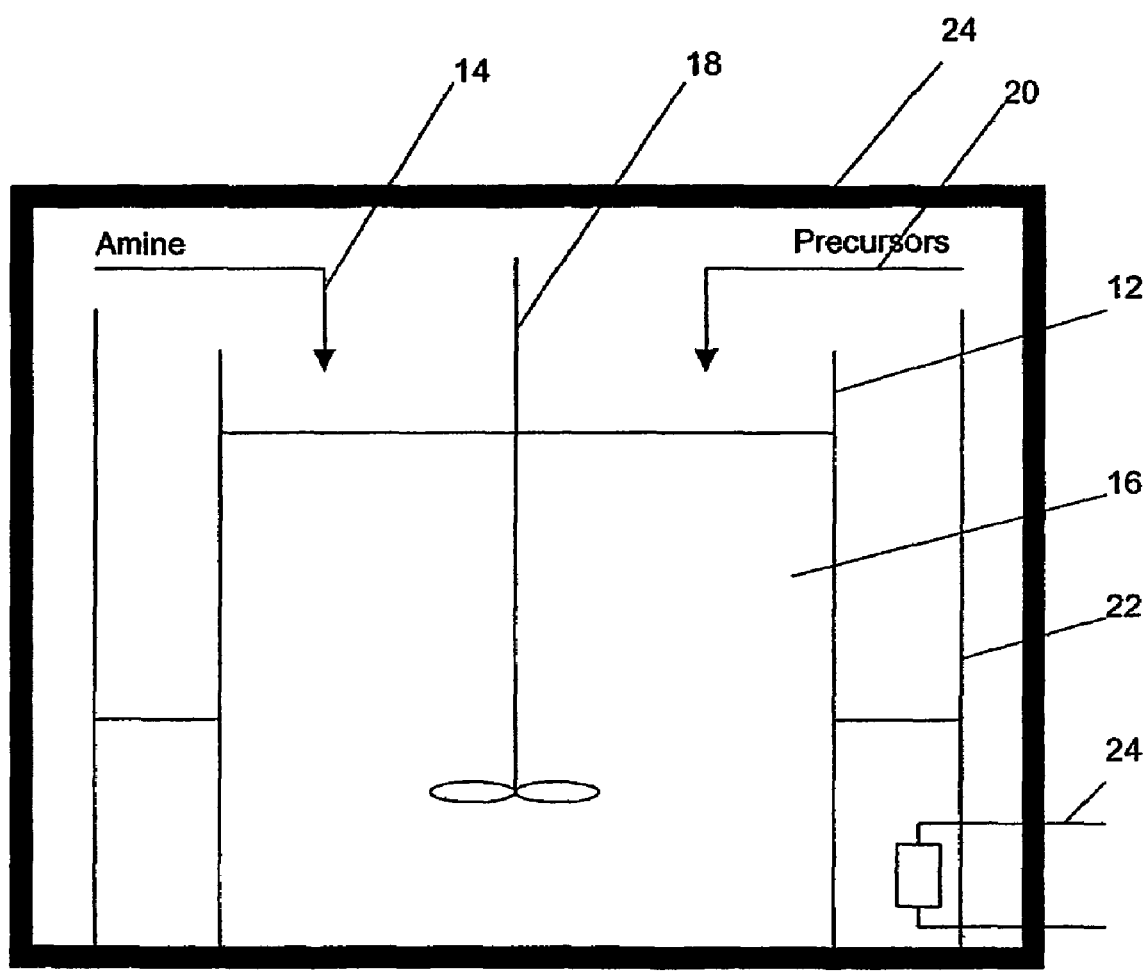
FIG. 2 shows a schematic diagram of a laboratory scale reactor vessel used to produce nano-sized particles in accordance with the first embodiment of the present invention.

Referring to FIG. 1 and FIG. 2, the first embodiment relates to a method for forming nano-sized metal chalcogenide particles. The method includes the step of preparing two reaction entities step S10, one containing amine (14) and one containing the organometallic precursor (16). As shown in FIG. 2, the two reaction entities may be mixed by either one of the following ways (step S20): (i) adding the precursor solution, in a jet or a dropwise manner, into the amine solution in the vessel, or (ii) adding the amine solution, in a jet or a dropwise manner, into the precursor solution in the vessel (12), or (iii) adding the amine solution to the solid precursor placed in the vessel, or (iv) adding the precursor solution to the solid amine placed in the vessel, or (v) passing the volatile gaseous amine over the precursor, in solution or in solid form, in the vessel. The metal complex precursors comprise a chalcogenide and an electrophilic group. The media within the vessel may be aqueous or non-aqueous or a mixture of gaseous and liquid. The vessel may be sealed or opened, and may be under normal or elevated pressure.

The reaction solution may be stirred at a defined stirring speed, at a defined amine to metal precursor ratio and at a defined heating rate and temperature range as shown by Step S20.

The stirring can be achieved by locating impeller (18) in the reactant solution. This ensures that there is an even distribution of the amine (14) within the solution of metal complex precursors (16), so that a disproportionate concentration of amine (14) in any part of the solution of metal complex precursors (16) is avoided.

The reaction occurs for a defined period of time as disclosed above. At the end of the reaction time, nano-sized metal chalcogenide particles are produced as shown by step S30.

The vessel (12) may be heated, cooled or maintained at room temperature. Heating may be provided using a heating mantle, oil bath or water bath (22). Temperature of the reaction mixture may be thermostatically controlled (24).

The nano-sized metal chalcogenide particles formed during the reaction of the metal complex precursors (16) and the amine (14) are suspended in the reactant solution. After the suspension of nano-sized metal chalcogenide particles have been formed, the particles may be subjected to a centrifugation or a filtering step (S40). Centrifugation is performed with a centrifuge or an ultra-centrifuge machine. A suitable filter may be a rotary drum filter, a filter press, a vacuum filter or a bag filter. This is carried out so that excess reactant liquor may be washed (S50) from the particles to remove any by-products.

In other embodiments, the suspension of particles may be aged for a period of time before the filtering step.

After washing (S50), the nano-sized particles may be dried in an oven or by vacuum (S60).

Without being bound by theory it is thought that, when the electrophilic group, such as a carbonyl group or CS, reacts with the metal complex precursors, the electrophilic (i.e. electron-deficient) carbon atom of the carbonyl group or CS in the precursor is attacked by the selected nucleophilic (i.e. electron-rich) amine group. This hence mediates the detachment of the adjacent chalcogens (X) from the point of attack and results in the breakdown of the metal complex precursor to produce nano-sized metal chalcogenide particles that are free of the carbonyl group or CS.

Without being bound by theory it is also believed that the amine group acts as a stabilizing agent, thus limiting the growth of metal chalcogenide particles into the nanometer regime.

In one embodiment, it is possible to bind the nano-structure to form a coherent mass of nano-sized metal chalcogenide particles.

BEST MODE & EXAMPLES

A best mode of preparing metal chalcogenide nanoparticles presently known to the applicant will now be described with reference to the following non-limiting examples.

Experiment 1

99% Hexadecylamine (HDA) was obtained from Sigma-Aldrich of St. Louis, Mo., United States of America, was dried and degassed at 120° C. before use with nitrogen.

Silver(I) thiobenzoate Ag(SCOPh) precursors crystals were derived from according to the report: V. V. Savant, J. Gopalakrishnan, C. C. Patel, *Inorg. Chem.* 1969, 9, 748. A degassed solution of 0.025 g of Ag(SCOPh) precursors crystals in 0.2 ml of trioctylphosphine (TOP) obtained from Sigma-Aldrich of St. Louis, Mo., United States of America was prepared. The mixture was injected into a hot HDA solution. This was repeated for a number of temperatures in the range of 80° C.-120° C., as given in Table 1 below.

After mixing, the pale yellow solution rapidly changed to brown. After 10 min, the reaction solution was cooled to room temperature, then ~1 ml of toluene was added and $Ag_2S$ product precipitated with methanol. The precipitate was centrifuged, washed thoroughly with methanol and dried in vacuum overnight.

Experiment 2

The experimental procedure for Example 1 was repeated whereby the Ag(SCOPh) precursors crystals were introduced into HDA at 60° C. and the mixture was heated to a desired temperature range of 100° C. to 120° C. In experiment 2, however, the $Ag_2S$ precipitate aged at that temperature for 30 minutes. The results are given in Table 2 below.

Experiment 3

The experimental procedure for Example 1 except instead of HAD amine being used, Octylamine (OA), Dioctylamine (DOA), and Ethylenediamine (EA) were used.

Results of Experiment 1, 2 & 3

Samples of the $Ag_2S$ nanoparticles were studied by obtaining an X-ray diffraction (XRD) pattern using a Bruker D5005 diffractometer with Cu Kα radiation ($\lambda$=0.151478 nm). Transmission Electron Microscopy (TEM) was performed on a Philips CM 100 microscope operating at 100 kV while HRTEM was performed on a Philips CM300 PEG instrument with an acceleration voltage of 300 kV. SEM images were obtained using a JEOL JSM6700 microscope, operating at 10 amp and 15 kV.

Table 1 provides a summary of the results for experiment 1 & experiment 3:

TABLE 1

| Amine* | [Amine]:[Precursor] | Reaction Temperature | Reaction Time | Average size from TEM (nm) | Morphology |
|---|---|---|---|---|---|
| HAD | 8 | 120° C. | 10 m | 47.7 ± 4.2 | Cubes |
| HAD | 12 | 120° C. | 10 m | 44.0 ± 4.3 | Cubes |
| HAD | 16 | 120° C. | 10 m | 40.8 + 5.1 | Cubes |
| HAD | 20 | 120° C. | 10 m | 31.5 + 3.0 | Cubes |
| HAD | 8 | 100° C. | 10 m | 31.7 + 2.6 | Hexagons & cubes |
| HAD | 12 | 100° C. | 10 m | 20.5 ± 2.4 37.4 ± 4.3 × 18.6 ± 2.3 | Hexagons & rods |
| HAD | 16 | 100° C. | 10 m | 25.7 ± 3.5 46.5 ± 5.3 × 21.4 ± 3.4 | Hexagons & rods |
| HAD | 20 | 100° C. | 10 m | 29.6 ± 1.5 | Hexagons |
| HAD | 8 | 80° C. | 15 m | 6.7 ± 0.6 | Faceted particles |
| HAD | 16 | 80° C. | 15 m | 14.5 ± 0.9 | Hexagons |
| HAD | 20 | 80° C. | 15 m | 20.9 ± 1.6 | Hexagons |
| OA | 8 | 120° C. | 10 m | 43.0 ± 6.4 | Cubes |
| OA | 20 | 120° C. | 10 m | 39.1 ± 5.9 | Cubes |

TABLE 1-continued

| Amine* | [Amine]: [Precursor] | Reaction Temperature | Reaction Time | Average size from TEM (nm) | Morphology |
|---|---|---|---|---|---|
| DOA | 12 | 120° C. | 10 m | 11.1 ± 1.9 | Faceted particles |
| DOA | 16 | 120° C. | 10 m | ~13 | Not homogenous |
| DOA | 20 | 120° C. | 10 m | ~17 | Not homogenous |
| EA | 16 | 120° C. | 10 m | — | Network-like |

Figure 3A:
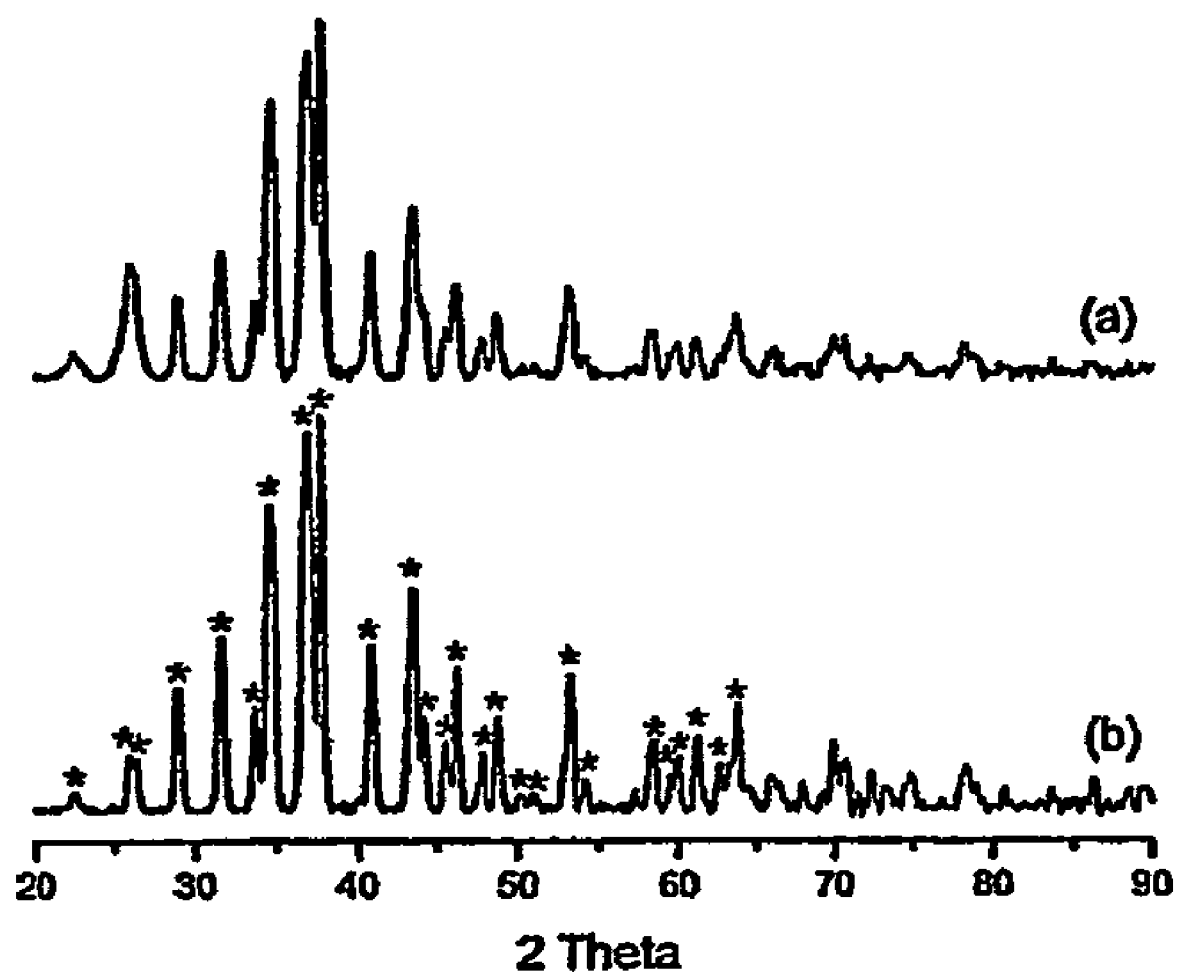
FIG. 3a shows representative X-ray diffraction patterns of $Ag_2S$ (a) nanohexagons formed at 80° C. and (b) nanocubes formed at 120° C.
Figure 3B:
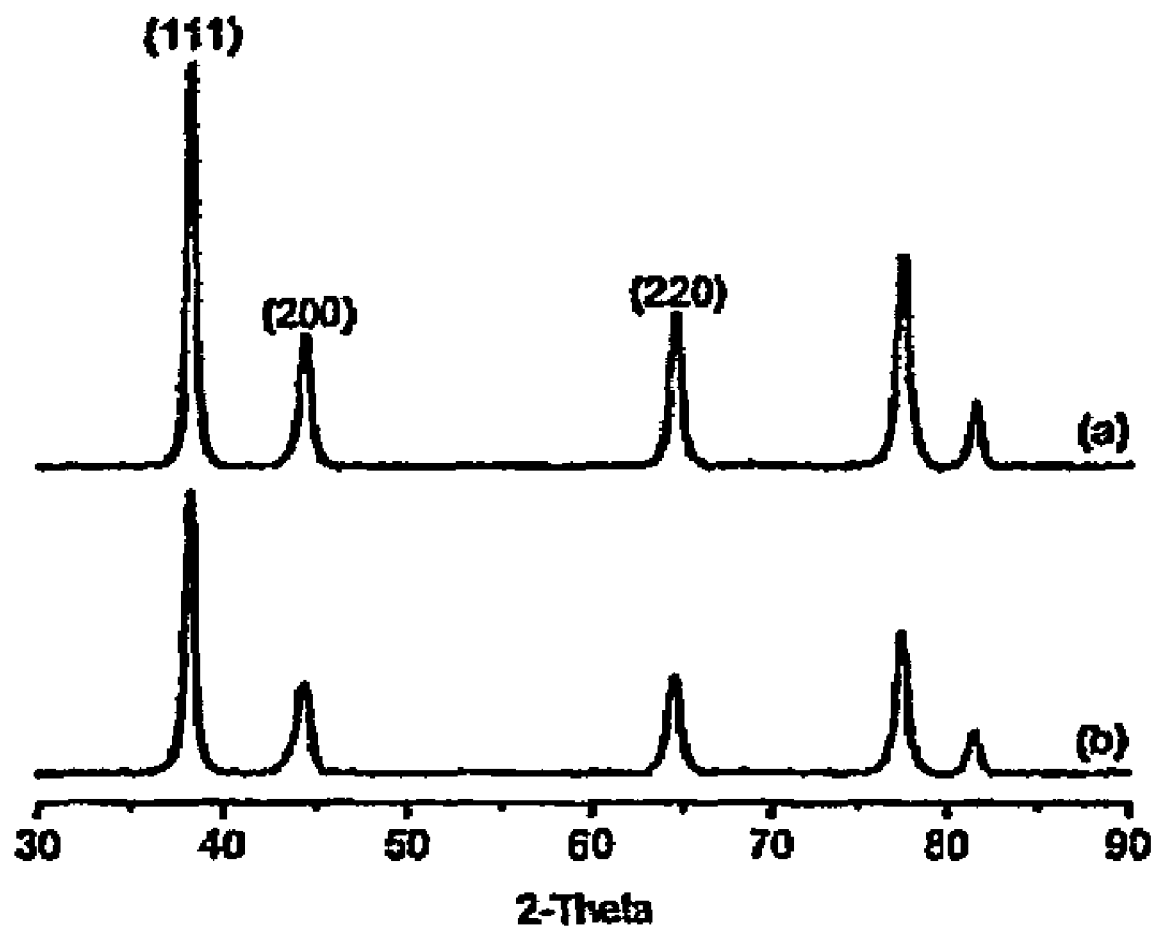
FIG. 3b an XRD picture of the Ag nanoparticles obtained by injecting a metal complex precursor into TOPO alone: (a) Precursor: TOPO=1:8, injection T=100° C.; (b) Precursor: HDA=1:2, injection T=100° C.

The Ag(SCOPh) precursors crystals were found to decompose in amine at room temperature to give $Ag_2S$ nanoparticles. When a solution of the precursor dissolved under nitrogen was added into a warm solution (80, 100 or 120° C.) of long-chain amine such as hexadecylamine (HDA), well-defined nano-particles are formed of which the size is shown in Table 1 above. All the prepared $Ag_2S$ nanoparticles were characterized by XRD and TEM. Pure phases of $Ag_2S$ are observed for all samples and the XRD patterns reveal the acanthite phase of $Ag_2S$ with a monoclinic (rhombic) structure as shown in FIG. 3a and FIG. 3b.

It can be seen from Table 1 that various shapes of $Ag_2S$ nanocrystals can be readily produced, sometimes as the exclusive form, by varying the reaction temperature and amine concentration. At low temperature (80° C.), hexagonal nanocrystals of $Ag_2S$ are obtained when the precursor is injected into HDA.

Figure 4:
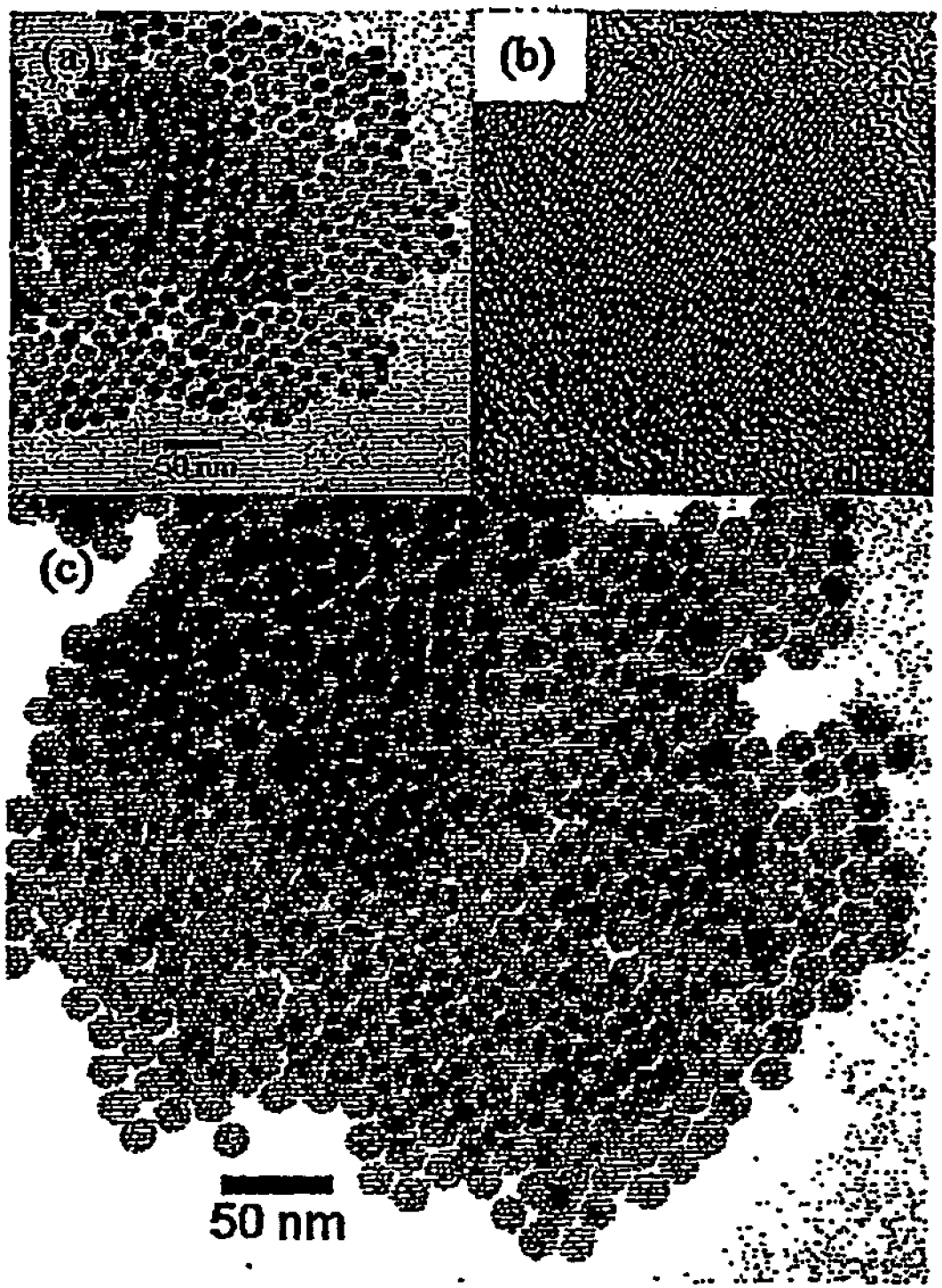
FIG. 4 shows: (a) a representative TEM micrograph of $Ag_2S$ nanoparticles produced at 80° C., (b) HRTEM image for one of the hexagonal nanocrystals; (c) TEM image showing clearly monolayer and multilayers of closed-packed assembly of the nanocrystals.

FIG. 4a shows a TEM image of the hexagonal nanocrystals, which reveal a self-assembled 2D closed-packed structure of $Ag_2S$. FIG. 4b shows a HRTEM image of one of the hexagonal crystals, and it can be seen that clear lattice planes confirm the good crystallinity (d spacing=2.8 Å) of the particles produced at such low temperature. The average diameter of the nanocrystals was 14.5 nm with a size distribution of 6.2%, and the inter-particle distance was 18.6 nm (core to core).

FIG. 4c shows a TEM image of the closely packed nanocrystals. It can be seen from FIG. 4c that in regions where two layers of these particles overlap, the hexagonal closed-packed pattern is clearly maintained in the overlayers. Such closed-packed stackings can lead to the formation of 3D self-organized superlattices and controlled thickness of the assembly may be made.

Figure 5:
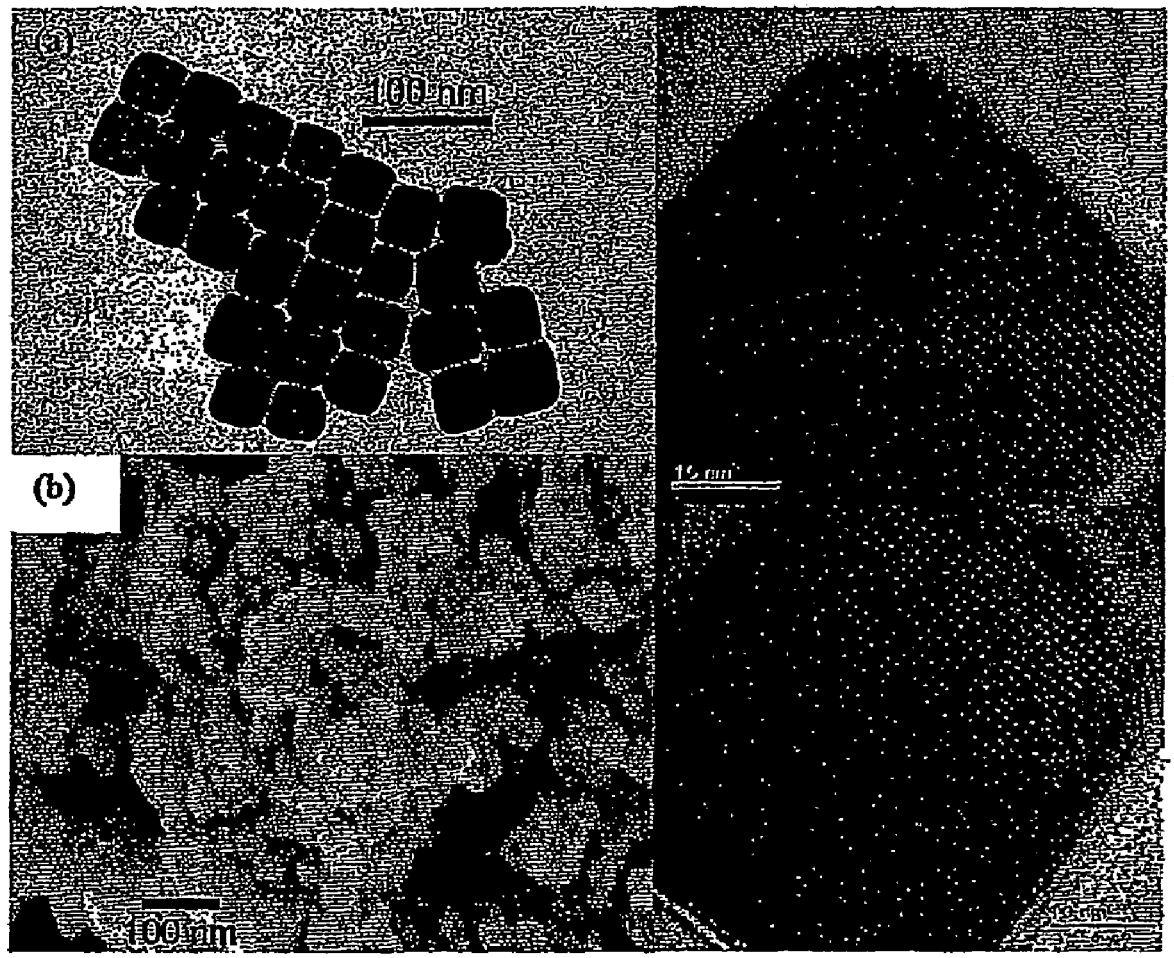
FIG. 5 shows: (a) a representative TEM micrograph of $Ag_2S$ nanocubes produced at 120° C., (b) SEM image showing clusters of abundant $Ag_2S$ nanocubes, (c) and (d): HRTEM images showing clear lattice fringes of the nanocubes.

It was found that by just increasing the injection temperature to 120° C., cube-structured $Ag_2S$ are obtained exclusively. The uniform $Ag_2S$ nanocubes self-assemble into ordered 2D arrays on the surface of TEM grid as shown by FIG. 5a. The average diameter of these nanocubes is 44.0 nm with a size distribution of 9.8%. SEM image as shown in FIG. 5b (sample coated with gold to improve contrast) illustrates that abundant quantity of these nanocubes can be obtained using this approach. In FIGS. 5c and 5d, HRTEM images clearly show that these $Ag_2S$ nanocubes are single crystals with sharp lattice fringes extending to the edges with minimum defects.

Figure 6:
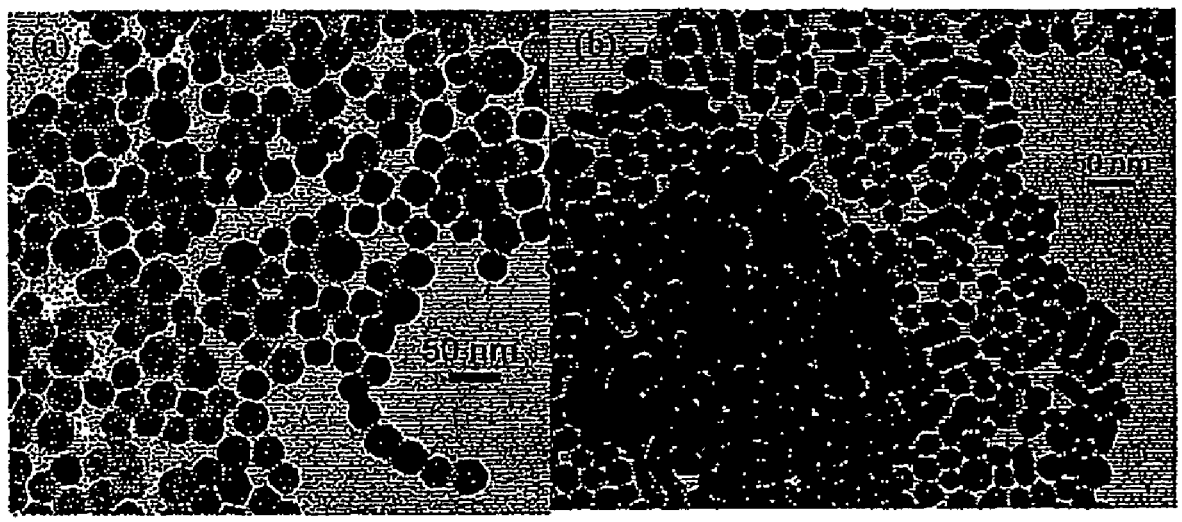
FIG. 6 shows a representative TEM micrographs showing mixture of (a) nanocubes & nanohexagons ([HDA]/[Precursor]=8) and (b) nanorods and nanohexagons ([HDA]/[Precursor]=16) obtained at 100° C.

Exclusive formation of nanoparticles having hexagonal and cube shape are obtained at ~80° C. and ~120° C. respectively. Mixtures of nanoparticles having cube and hexagonal shape were obtained at a relatively low amine concentration and nanoparticles having hexagonal and rod shapes (medium amine concentration) can be obtained at an injection temperature of 100° C. as shown by FIG. 6).

It has also been found that injection of the metal complex precursor into hot TOPO (>120° C.) alone yielded Ag nanoparticles instead of $Ag_2S$. Hence, the amine was found, in this particular $Ag_2S$ synthesis system, to affect not just the size and shape controlling agent, but also to facilitate the decomposition of the precursor to $Ag_2S$ as shown by the suggested Scheme 1 below:

Scheme 1

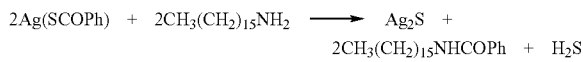

$$2Ag(SCOPh) + 2CH_3(CH_2)_{15}NH_2 \longrightarrow Ag_2S + 2CH_3(CH_2)_{15}NHCOPh + H_2S$$

In the presence of amine, the stronger S—C bond is broken instead of the weaker $Ag_2S$ bond. Without being bound by theory, it is thought that this is due to an initial nucleophilic attack of the amine onto the thiocarboxylate carbon atom. The reaction is best described as a degradation reaction (not a nucleophilic substitution), however, since the formal charges of silver (1+) and sulfur (2−) do not change in the formation of $Ag_2S$ while the structure of the precursor is destroyed. During the reaction, $H_2S$ gas is evolved and an amide is produced as by-products.

Figure 7:
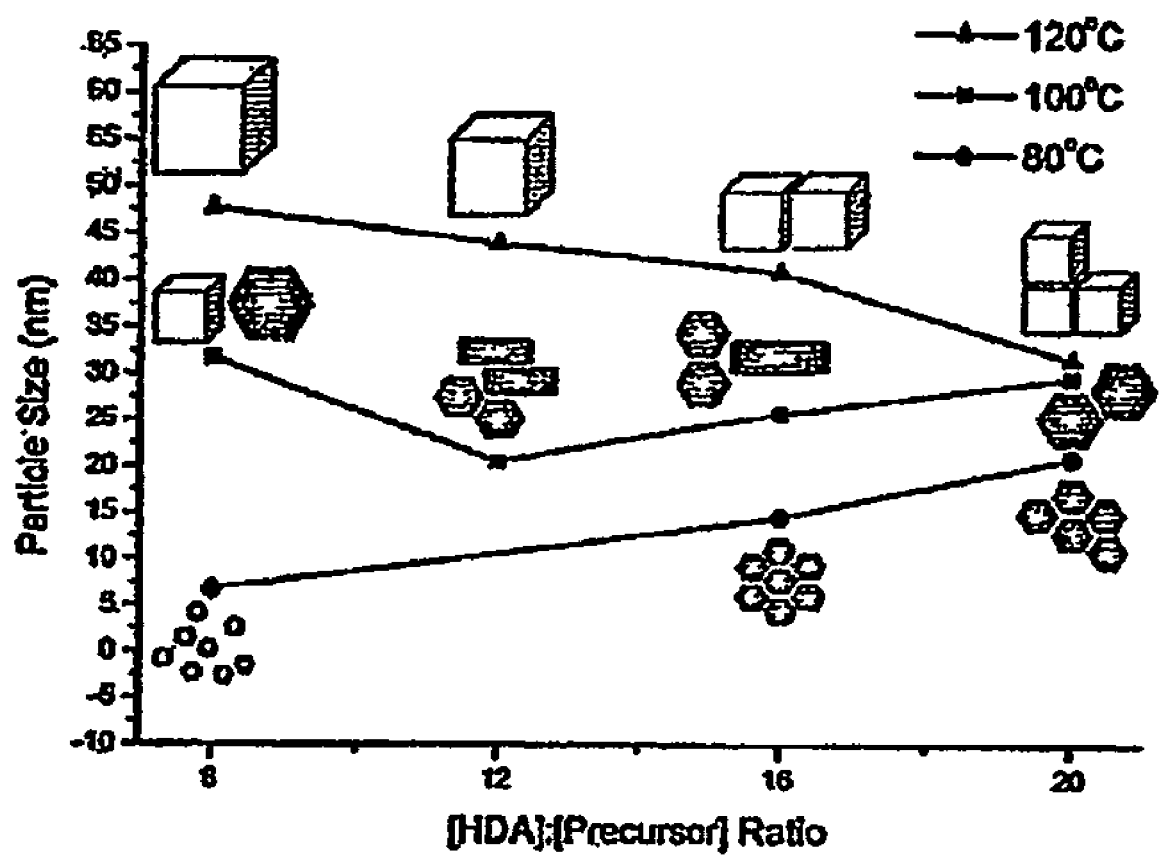
FIG. 7 is a graph showing the effect of temperature and amine-to-precursor ratio on the shape and size of the $Ag_2S$ nanocrystals obtained. Size of nanorods is not included in the graph.

It can be observed from Table 1 that varying the amine-to-precursor ratio provides a systematic control of the size of the $Ag_2S$ nanoparticles. A plot of average sizes against amine-to-precursor ratios reveals different trends for the three injection temperatures is shown in FIG. 7. The final size of the $Ag_2S$ nanoparticles appears to be a delicate balance between the surface-capping role and the nucleophilic attacking role of HDA. Thus, while degradation reaction readily occurs at higher temperature (120° C.), the size-controlling role of HDA will dominate. As such, smaller crystals are obtained when more capping agent is present—a trend which is common to most reported preparation of nanoparticles. When the temperature is low (80° C.), however, the nucleophilic attacking role of HDA becomes important. In this case, increasing the amount of HDA will increase the rate of degradation and hence increases the particle size. At intermediate temperature (100° C.), the two roles are competing with each other and it was observed that a steady increase in crystal size occurs only when the amine-to-precursor ratio exceeds a certain value.

It may be concluded from FIG. 7 that the formation of nanocubes is favored by high temperature and low amine ratio; while the nanohexagons are formed at low temperature and high amine ratio. Prolonged heating of the reaction mixtures up to 1 hour did not change the particle morphology although the particle sizes are slightly affected. The rate of heating also plays an important role in controlling the size and shape of the $Ag_2S$ nanoparticles.

Figure 8:
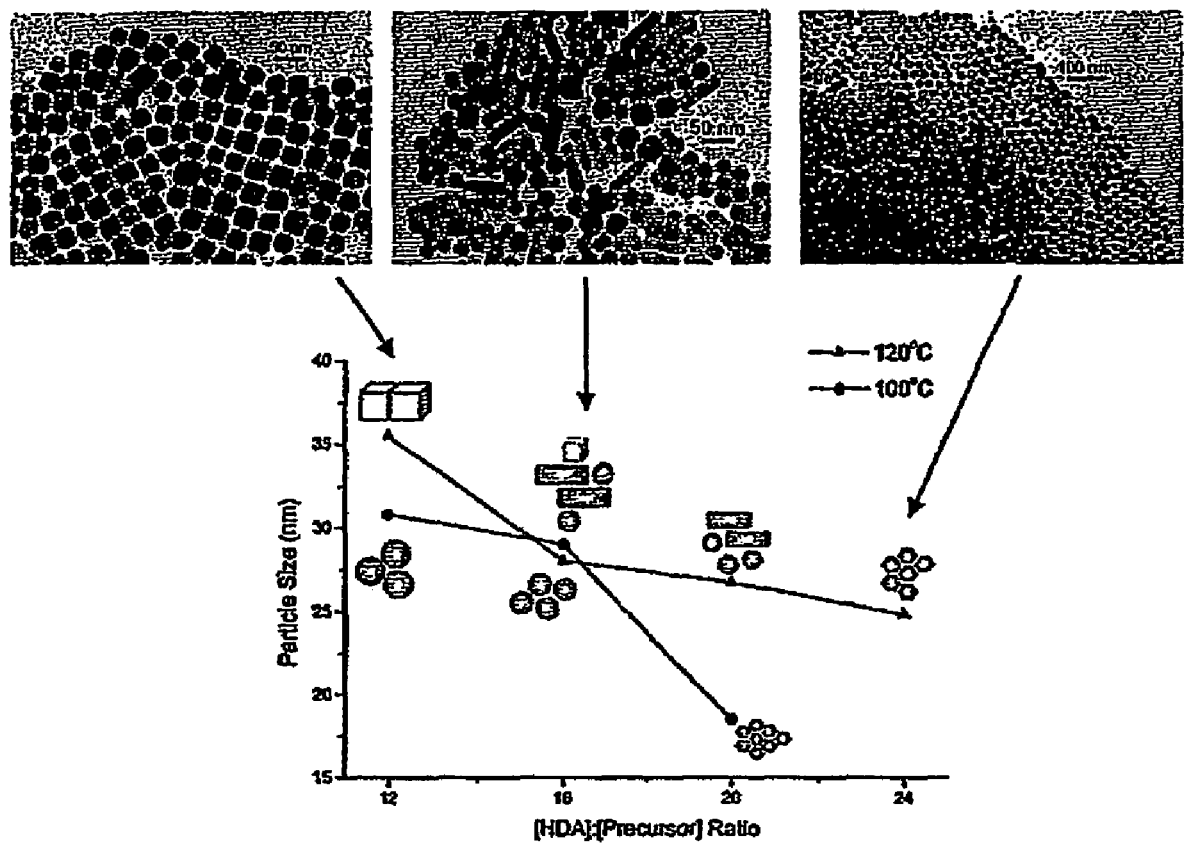
FIG. 8 shows the shape and size of $Ag_2S$ nanocrystals obtained by the slow heating and aging method, the effect of temperature and amine-to-precursor ratio is illustrated and typical TEM images for 120° C. are also shown.

In experiment 3, the $Ag_2S$ nanoparticles were also prepared by injecting the metal complex precursor into HDA solution at 60° C. (necessary to maintain liquid HDA) and slowly heating the reaction mixture and aging it at 100° C. (or 120° C.) for 30 minutes. It was found that fairly uniform particles can also be obtained but their shape and size are in different trend as summarized in Table 2 and FIG. 8.

TABLE 2

| Amine | [Amine]:[Precursor] | Aging Temperature | Aging Time | Average size from TEM (nm) | Morphology |
|---|---|---|---|---|---|
| HAD | 12 | 120° C. | 30 m | 35.5 ± 2.2 | Cubes |
| HAD | 16 | 120° C. | 30 m | 28.0 ± 3.3<br>68.5 ± 8.6 × 20.6 | Cubes, Spheres |
| HAD | 20 | 120° C. | 30 m | 26.7 + 3.7<br>57.4 ± 5.6 × 25.4 | Spheres & rods |
| HAD | 24 | 120° C. | 30 m | 24.8 ± 1.3 | Hexagons |
| HAD | 12 | 100° C. | 30 m | 30.8 ± 2.7 | Spheres |
| HAD | 16 | 100° C. | 30 m | 29.0 ± 1.8 | Spheres |
| HAD | 20 | 100° C. | 30 m | 18.5 + 2.8 | Hexagons |

It has been observed that nanocubes are now only observed at low amine concentration even when aged at 120° C., while hexagons are exclusively obtained at high amine concentration. A mixture of spheres, cubes and nanorods are obtained at medium amine concentration. When the aging temperature is set at 100° C., either spherical (low amine) or hexagonal (high amine) nanocrystals are obtained.

The morphology control of the produced $Ag_2S$ nanoparticles may be summarised as follows:

(1) Fast injection of the precursor into HDA at 120° C. will give nanocubes exclusively regardless of the amine concentration;
(2) Slow heating of the precursor and HDA mixture to 120° C., however, will give nanocubes only when the amine concentration is low;
(3) Formation of nanohexagons is favored when the temperature is lower, i.e. 80° C. (fast injection method) or 100° C. (slow heating) at high amine concentration; and
(4) Elongated structures are obtained with medium amine concentration at 100° C. (fast injection method) or 120° C. (slow heating). We believe that such a morphology control is related to various factors, e.g. the rate of nucleation and growth, the remaining monomer concentration after nucleation, and the capping effect of amine on the nanocrystals.

The nature and type of amine are also found to be important in the shape control, as can be observed in Table 1. The formation of nanocubes is only observed in HDA and octylamine (OA) but not in dioctylamine (DOA) or ethylenediamine (EDA) at 120° C. Since the nucleophilicity of these amines are similar, without being bound by theory, it is believed that steric effects may also play a decisive role in the shape and control.

The experiments 1–3, disclosed methods of preparing $Ag_2S$ nanocrystals by an amine-mediated reaction under mild conditions, that at a temperature in the range of 80° C. to 120° C. By controlling the amine and metal complex concentration, it is possible to predict the size and shapes of $Ag_2S$ nanoparticles. The simultaneous assembly of these $Ag_2S$ nanoparticles into 2D superstructures is also demonstrated.

Experiment 4

Synthesis of $Cd(S(CO)C_6H_5)_2$ Precursors

Metal thiobenzoates were prepared according to method disclosed in V. V. Savant, J. Gopalakrishnan, C. C. Patel, *Inorg. Chem.* 1970, 9, 748. A procedure for synthesis of $Cd(S(CO)C_6H_5)_2$ is given as follows:

Thiobenzoic acid (0.01 mol) obtained from Fluka of Seelze, Germany was added slowly to a stirred solution of $Na_2CO_3 \cdot 10H2O$ (0.005 mol) obtained from Sigma-Aldrich of St. Louis, Mo., United States of America in deionized water (20 mL). The mixture was stirred for 30 minutes, and was then added to a solution of $CdCl_2$ (0.005 mmol) in deionized water (40 mL). Creamy precipitates appeared quickly during the process, and the mixture was stirred for 1 hour to ensure complete reaction. After centrifugation, the supernatant was discarded and solid was washed several times with water.

The $Cd(S(CO)C_6H_5)_2$ precursors product were then dried under vacuum with $P_2O_5$ and subsequently used in Experiment 4.

Preparation of CdS Nanoparticles 120 mg of $Cd[S(CO)C6H5]_2$ metal precursor was added into 0.5 ml of octylamine in 5 ml of toluene to form a clear yellow solution. After stirring at room temperature for 2 hours, ethanol was then added into the reaction mixture to induce precipitation and form pale yellow CdS nano-particles. The CdS nano-particles were isolated in a centrifuge and washed.

Figure 9:
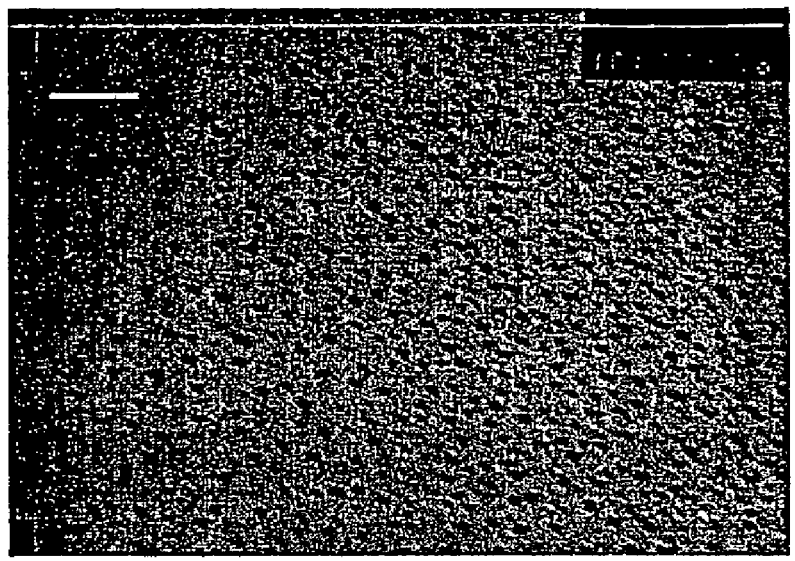
FIG. 9 is a picture of a TEM image showing the uniform sizes of CdS nanomaterials prepared in example 4.

The resulting CdS nano-particles were dispersed in a nonpolar solvent and were subjected to ultraviolet absorption spectroscopy shows a band-edge absorption ~420 nm, indicating the blue-shifted quantum confinement characteristic of the CdS nanomaterials. TEM analysis indicates the uniform-sized spherical CdS nanomaterials obtained as shown in FIG. 9.

Experiment 5

Synthesis of $Pb[S(CO)C_6H5]_2$ Precursors $Pb[S(CO)C_6H5]_2$ precursors were prepared in the same method as for the $Cd(S(CO)C_6H_5)_2$ of experiment 4 precursors except Pb replaces the Cd salts.

Figure 10:
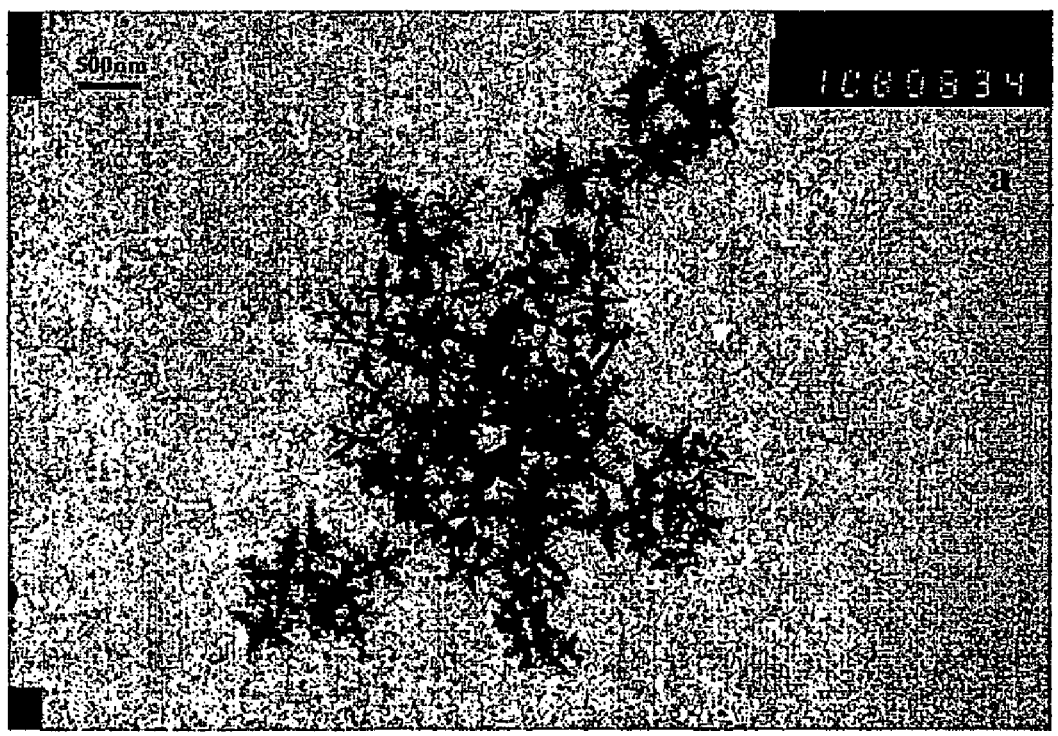
FIG. 10 is a picture of a TEM image showing dendrite-shaped PbS nanomaterials prepared in example 5.

Preparation of PbS Nanodendrites 0.01 g of $Pb[S(CO)C_6H5]_2$ precursors were placed in a round-bottom flask and then 2 ml of ethylene diamine was injected into the flask. The $Pb[S(CO)C_6H5]_2$ precursors dissolved with stirring and after a short while turbidity appeared. After stirring for a further 15 min, the mixture was centrifuged to separate the flocculants. The black solid isolated was washed and then dried in vacuum. TEM analysis shows PbS nanomaterials of unique dendrite shapes having a particle size in the range of 20–400 nm sizes as shown by FIG. 10. Accordingly, the amine plays both the roles of mediating the reaction and stabilizing the produced nano-particles. Nevertheless, it is possible to replace the amine's role of stabilizing the nano-particles with other suitable stabilizing materials such as surfactants or polymers. This will allow the reaction to be mediated within a host or matrix as illustrated by experiment 6 below.

Experiment 6

Synthesis of $AgS(CO)C_6H_5$ Precursors $AgS(CO)C_6H_5$ precursors were prepared in the same method as for the $Cd(S(CO)C_6H_5)_2$ of experiment 4 precursors except Pb replaces the Cd salts.

Figure 11:
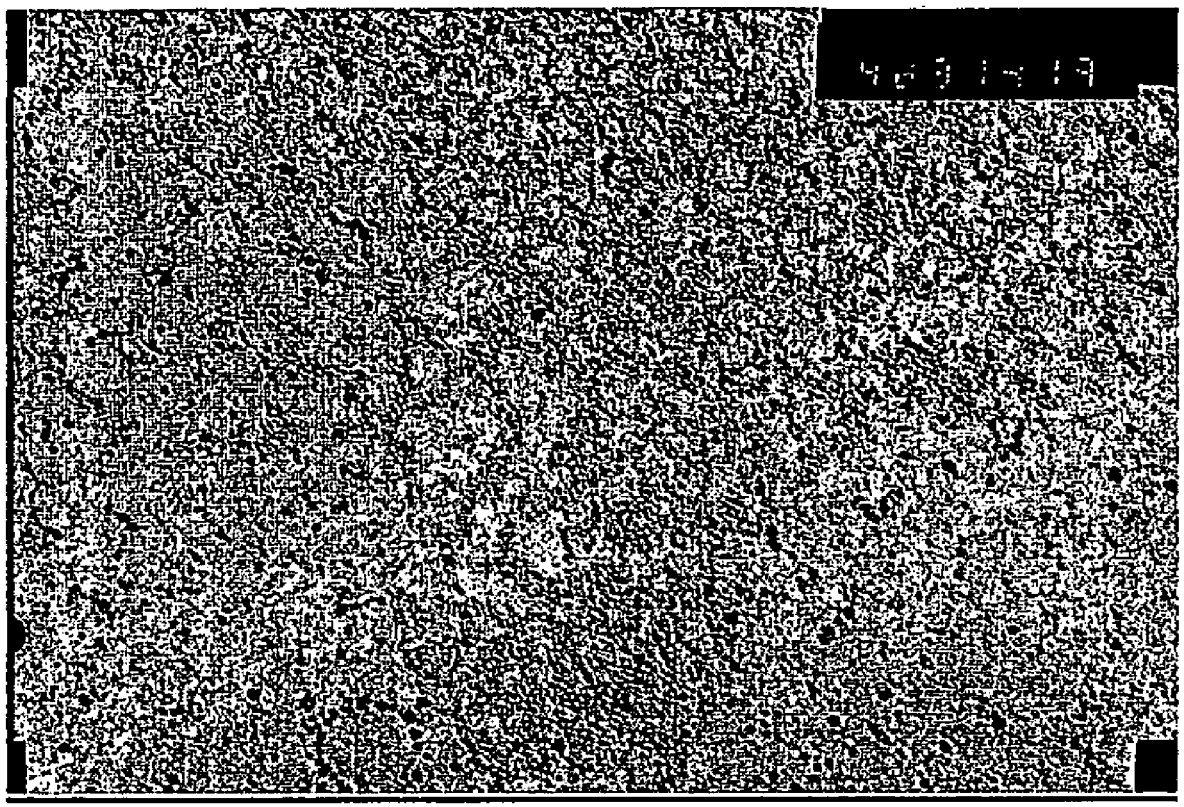
FIG. 11 is a picture of a TEM image showing monodispersed nanocomposites prepared in example 6.

Preparation of Polymer Embedded $Ag_2S$ Nanocomposites 60 mg of $AgS(CO)C_6H_5$ precursors were added into 10 ml of 0.025 M polyvinyl pyrolidone (PVP) polymer in chloroform. The mixture was stirred for 10 min and then 20 µl of n-propylamine was injected. The $AgS(CO)C_6H_5$ precursors dissolved gradually and a clear brown solution formed after about 2 hours. The mixture was then centrifuged and solid $Ag_2S$ precipitate was isolated, washed and then dried in vacuum. TEM analysis shows uniform $Ag_2S$-PVP nanocomposites in FIG. 11.

Experiment 7

Figure 12:
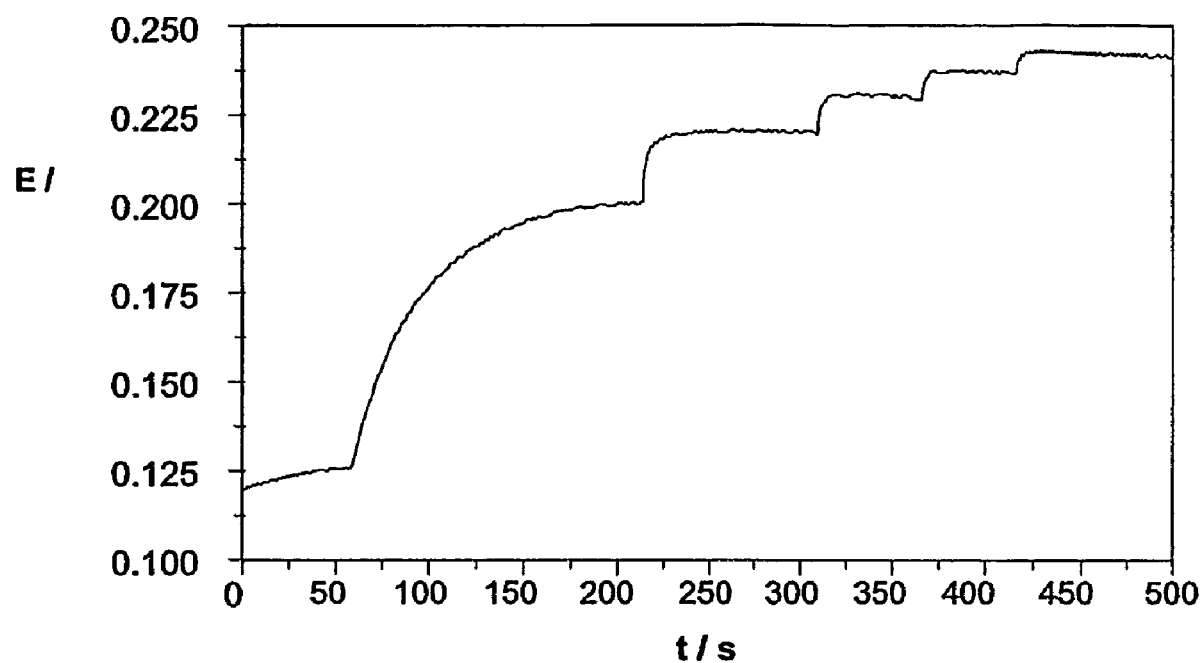
FIG. 12 shows an electrode response of silver ion with a PANI/$Ag_2S$ film.

Preparation of Polyaniline(PANI)/Ag$_2$S Nanocomposites 60 mg of AgS(CO)C$_6$H$_5$ precursors were added into 10 ml of 0.025 M polyaniline(PANI) polymer in chloroform. The mixture was stirred for 10 min and then 20 μl of n-propylamine was injected while the mixture was held at a temperature between 20–30° C. The AgS(CO)C$_6$H$_5$ precursors dissolved gradually and a clear brown solution formed after about 2 hours. The mixture was then centrifuged and solid Ag$_2$S/polyaniline composite was isolated, washed and then dried in vacuum. After centrifugation and washing, the nanocomposites were redissovled and a film was deposited on the surface of ITO by spin coating. ITO stands for indium tin oxide, and is a commonly used transparent and conductive substrate. The modified ITO is tested as Ag ion-selective electrode. Potentiometry measurement was done using ITO as working electrode, Ag/AgCl as the reference electrode and Pt wire as the counter electrode. The electrode response of silver ion with the PANI/Ag$_2$S film is shown in FIG. 12. Hence with each incremental addition of Ag solution, we detect a clear increase in the electrode signal. It is thus confirmed that the modified electrode is useful as a silver ion selective electrode.

APPLICATIONS

It will be appreciated that a number of advantages are provided by one or more of the embodiments disclosed herein.

It will be appreciated from the disclosed embodiments that there is provided a method of synthesising metal chalcogenide particles. Advantageously, the metal chalcogenide particles may be nano-sized. The nano-sized metal chalcogenide particles may be used in potential applications such as biological markers, nonlinear optical materials, luminescent devices, photodetectors, catalysts, and chemical sensors, etc.

It will be appreciated from the disclosed embodiments that there is provided a method of synthesising metal chalcogenide particles at relatively low temperatures in the range at or below 120° C. The low temperatures are advantageous in that the reactants are not as hazardous to handle and may not require the use of specialised equipment or utilise as much energy as for reactant solutions at higher temperatures.

Furthermore, the disclosed embodiments provide a method of synthesising metal chalcogenide particles that do not necessarily require the use of an inert atmosphere. This decreases the cost of producing metal chalcogenide particles, particularly on an industrial scale.

It will be appreciated from the disclosed embodiments that there is provided a method of synthesising metal chalcogenide particles which involves controlling the sizes and morphology of the particles. The simultaneous control of crystal shapes, in addition to their sizes and the higher surface-to-volume ratio, is advantageous.

It will be appreciated that the disclosed embodiments do not necessarily require the use of templates such as porous alumina, polymer membranes, carbon nanotubes and rodlike micelles or capping agents, such as surfactants, polymers, and ligands to control the shape of the particles.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A method of preparing metal chalcogenide particles comprising the step of reacting an amine and metal complex precursors, the metal complex precursors comprising a chalcogenide and an electrophilic group, the amine comprising a primary or secondary amine, whereby the reacting forms metal chalcogenide particles substantially free of the electrophilic group.

2. The method according to claim 1 comprising forming nano-sized metal chalcogenide particles.

3. The method according to claim 1, comprising:
   selecting an amount of the amine; and
   selecting an amount of the metal complex precursors, to obtain metal chalcogenide particles of a required size and morphology.

4. The method according to claim 3, comprising the step of stirring the reaction solution at a temperature and for a time to form a suspension of the metal chalcogenide particles, wherein the temperature and the selected amounts of the amine and the metal complex precursors in the reaction solution determines the morphology and the required size of the formed metal chalcogenide particles.

5. The method according to claim 4 comprising providing the temperature of the reaction solution in the range selected from the group consisting of: −5° C. to 300° C.; 15° C. to 200° C.; 70° C. to 150° C.; 75° C. to 140° C.; 80° C. to 130° C. and 80° C. to 120° C.

6. The method according to claim 4 comprising selecting the time for reacting the amine and the metal complex precursors in the range selected from the group consisting of: 1 minute to 1440 minutes; 1 minute to 720 minutes; 1 minute to 350 minutes; 1 minute to 240 minutes; 2 minutes to 180 minutes and 5 minutes to 120 minutes.

7. The method according to claim 4 comprising forming the metal chalcogenide particles with a morphology selected from the group consisting of: substantially wire shaped, substantially triangular shaped, substantially disk-like shaped (platelets), substantially dendrite shaped, substantially cube shaped, substantially rectangular shaped, substantially rod shaped, substantially spherical shape, substantially spindle shape, substantially hexagonal shape and substantially octagonal shape.

8. The method according to claim 3, comprising selecting the amount of amine to metal complex precursors in the reaction solution at a molar ratio in the range selected from the group consisting of: 0.1 to 100; 1 to 100; 0.1 to 50; 1 to 40; 4 to 40; 2 to 35; and 5 to 35.

9. The method according to claim 1 comprising forming metal chalcogenide particles with a mean particle size in the range selected from the group consisting of: 1 nm to 500 μm; 1 nm to 400 μm; 1 nm to 300 μm; 1 nm to 200 μm; 1 nm to 100 μm; 1 nm to 50 μm; 1 nm to 25 μm; 1 nm to 15 μm; 1 nm to 7 μm; 15 nm to 500 nm; 15 nm to 400 nm; 15 nm to 350 nm; 15 nm to 300 nm; 15 nm to 250 nm; 15 nm to 200 nm; 15 nm to 150 nm; 15 nm to 100 nm; and 15 to 40 nm.

10. The method according to claim 1 comprising providing the metal complex precursors with the general formula:

$$M_z[X(CY)R]_n$$

where M is a metal or transition metal selected from the group consisting of groups Ib, IIb, IIIa, IIIb, IVa, IVb, Va, Vb, VIb, VIIb and VIII of the Periodic Table;

where X is a chalcogen selected from the group consisting of: S, Se, and Te;

where R is a hydrocarbon;

where CY is an electrophilic group; and where n ranges from 1 to 6 and z ranges from 1 to 6 depending on the valence number of M and [X(CY)R].

11. The method according to claim 10, comprising providing the R group in the metal complex precursors as an alkyl group or an aryl group.

12. The method according claim 1 comprising providing the electrophilic group as a carbonyl group (C=O), or CS.

13. The method according to claim 1 comprising the amine as a primary amine, or a secondary amine represented by the general formula:

$(R')_x(R'')_y NH_x$ wherein R' and R" are hydrocarbon groups which is the same or different, x is 1 or 2 and y is 0 or 1 wherein when y is 1 then x is 1.

14. A method of preparing metal chalcogenide particles comprising the steps of:
(i) providing a reaction solution comprising a selected amount of an amine and a selected amount of metal complex precursors, the metal complex precursors comprising a chalcogenide and an electrophilic group, the amine being a primary or a secondary amine; and
(ii) stirring the reaction solution at a temperature and for a time to form a suspension of metal chalcogenide particles, wherein the temperature and the selected amounts of amine and metal complex precursors in the reaction solution determine the morphology and required size of the formed metal chalcogenide particles.

15. A method of preparing metal chalcogenide particles comprising the step of reacting an amine and metal complex precursors, the metal complex precursors comprising a chalcogenide and an electrophilic group, whereby the reacting forms metal chalcogenide particles substantially free of the electrophilic group.

16. A reaction solution for preparing metal chalcogenide particles, the reaction solution comprising:
an amine and metal complex precursors, the metal complex precursors comprising a chalcogenide and an electrophilic group, the amine comprising a primary or secondary amine, the amounts of amine and metal complex precursors in the reaction solution being sufficient to form metal chalcogenide particles substantially free of the electrophilic group.

17. The reaction solution according to claim 16, wherein the amount of amine to metal complex precursors in the reaction solution is at a molar ratio in the range selected from the group consisting of: 0.1 to 100; 1 to 100; 0.1 to 50; 1 to 40; 4 to 40; 2 to 35; and 5 to 35.

18. The reaction solution according to claim 17 wherein the temperature of the reaction solution is in the range selected from the group consisting of: −5° C. to 300° C.; 15° C. to 200° C.; 70° C. to 150° C.; 75° C. to 140° C.; 80° C. to 130° C. and 80° C. to 120° C.

19. The reaction solution according to claim 16 wherein the temperature of the reaction solution is in the range selected from the group consisting of: −5° C. to 300° C.; 15° C. to 200° C.; 70° C. to 150° C.; 75° C. to 140° C.; 80° C. to 130° C. and 80° C. to 120° C.

20. The reaction solution according to claim 16 wherein the metal chalcogenide particles have a mean particle size in the range selected from the group consisting of: 1 nm to 500 μm; 1 nm to 400 μm; 1 nm to 300 μm; 1 nm to 200 μm; 1 nm to 100 μm; 1 nm to 50 μm; 1 nm to 25 μm; 1 nm to 15 μm; 1 nm to 7 μm; 15 nm to 500 nm; 15 nm to 400 nm; 15 nm to 350 nm; 15 nm to 300 nm; 15 nm to 250 nm; 15 nm to 200 nm; 15 nm to 150 nm; 15 nm to 100 nm; and 15 to 40 nm.

* * * * *